Sept. 11, 1928.  1,684,052
W. H. BAYNARD
APPARATUS FOR ASSEMBLING STIFFENERS IN SHOE UPPERS
Filed March 13, 1924
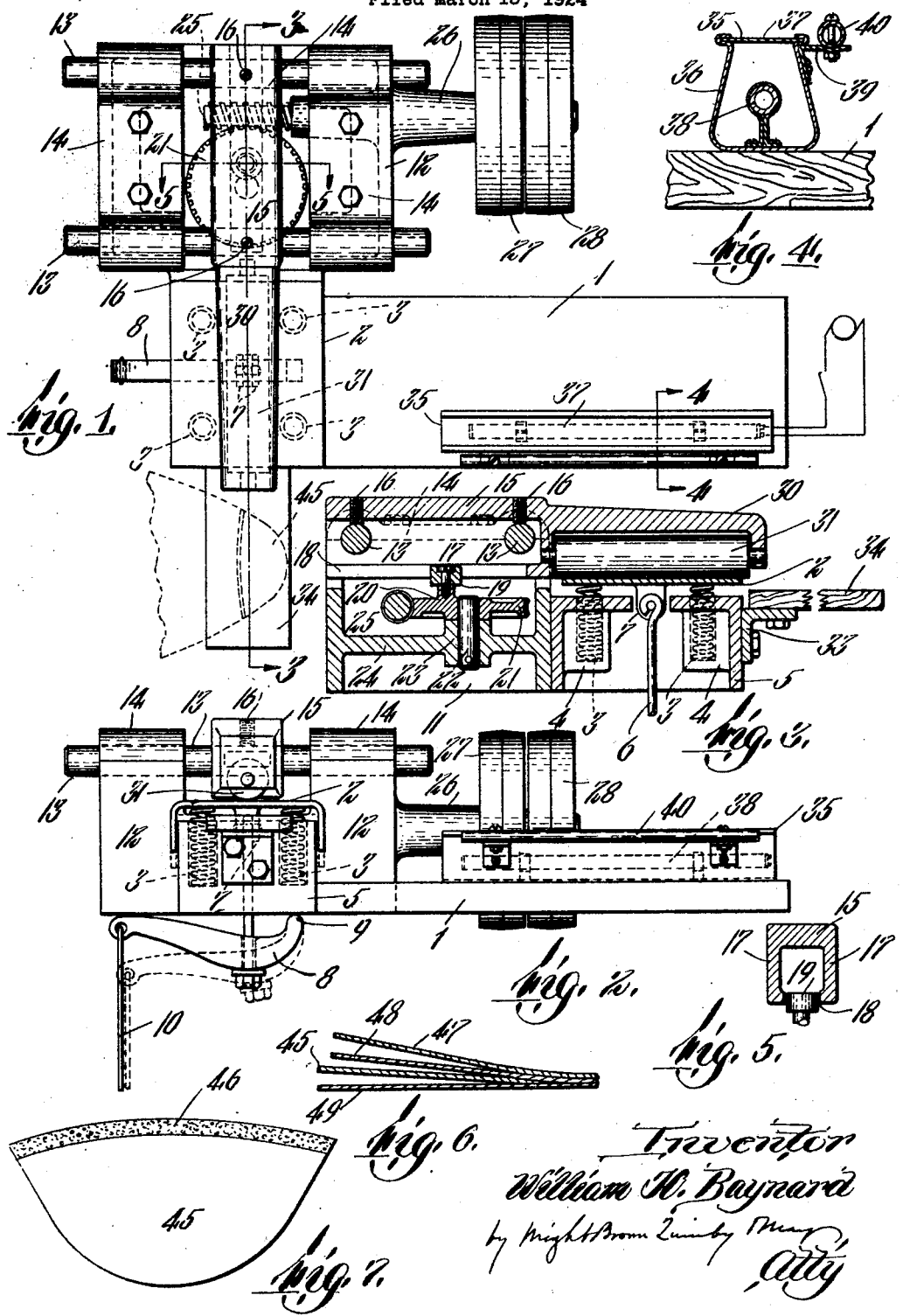

Patented Sept. 11, 1928.

1,684,052

UNITED STATES PATENT OFFICE.

WILLIAM H. BAYNARD, OF BOSTON, MASSACHUSETTS, ASSIGNOR TO HARRY H. BECKWITH, OF BROOKLINE, MASSACHUSETTS.

APPARATUS FOR ASSEMBLING STIFFENERS IN SHOE UPPERS.

Application filed March 13, 1924. Serial No. 698,830.

This invention relates to apparatus for use in assembling stiffeners in shoe uppers according to the method set forth in my application for patent Serial Number 619,555, filed February 17, 1923, for method for assembling stiffeners in shoe uppers and the article produced thereby, this application being in part a continuation thereof and relating to a modified construction of the apparatus.

Briefly the method comprises locally heating a portion of the surface of a stiffener formed of fibrous sheet material saturated with a thermoplastic, so as to cause the thermoplastic to exude, and while the exuded material is still tacky to assemble the stiffener in the upper and press the parts together. This causes the exuded material to partly penetrate the fabric portions of the upper between which the stiffener is positioned so that when this material sets it binds the parts securely together.

Referring to the accompanying drawings,

Figure 1 is a top plan of the apparatus.

Figure 2 is a front elevation thereof.

Figures 3, 4 and 5 are detail cross sections on lines 3—3, 4—4 and 5—5, respectively, of Figure 1.

Figure 6 is a cross section through the toe portion of a shoe upper showing the stiffener assembled therewith.

Figure 7 is a plan of the stiffener prepared for the assembling operation.

The apparatus comprises a platform portion 1 at one end of which is positioned a vertically movable table 2. This table as shown is supported on the upper ends of springs 3 each seated in a socket 4 in a support 5 projecting above the upper face of the platform 1. This table 2 may be pulled downwardly against the tension of the springs 3 until it strikes the upper face of the support 5 which acts to limit the extent of its depression by means of a pull rod 6 engaging ears 7 depending from the table, this pull rod passing through a lever element 8 having a fulcrum end 9 bearing on the under face of the support 5 and to the other end of which is fixed a link 10 which may be depressed as by means of a suitable treadle (not shown). Rearwardly of the support 5 is a machine base 11 having a pair of spaced upstanding bearing portions 12 for slidably supporting a pair of spaced guide rods 13 which are held in position by means of cap bars 14. Fixed to these rods 12 is a carriage 15 which may be reciprocated between the bearings 12.

As shown in Figures 1 and 3 the carriage 15 is fixed to the rods 13 by means of set screws 16. As shown best in Figure 5 the rear portion of the carriage 15 is formed of inverted U shape in cross section with downwardly extending side flanges 17 spaced at their lower ends to form a guideway 18 for a roller 19 journaled on a crank boss 20 of a worm wheel 21 (see Figure 3). This worm wheel is journaled on a shaft 22 fixed in a boss 23 on a horizontal web 24 in the machine head. Meshing with this worm wheel is a worm 25 at the end of a shaft having a bearing in one of the portions 12 which has an extended bearing hub 26 thereon and at the other end of this shaft is positioned the tight and loose pulleys 27 and 28. By rotation of the worm it is evident that the worm wheel 21 may be rotated, thus causing the cam roller 19 to pass back and forth within the guide slot 18 in the carriage and also to cause the carriage to reciprocate between the bearing portions 12 parallel to the surface of the table 2. The carriage 15 is extended over the table 2 as shown at 30 and has journaled in a socket in its lower face a pressure roller 31 against which the table 2 is pressed by means of the springs 3. To the forward face of the support 4 is fixed, as by means of an angle bracket 33, a platform 34, the upper face of which is on a level with the upper face of the table 2 when this table is depressed to its lower limit of motion in engagement with the support 4. The pressure roller thus moves in a horizontal plane only and at a fixed distance above the level of the platform 34.

The platform 1 also carries a hot plate indicated at 35. This hot plate comprises a U shaped metal trough 36 having a flat plate 37 bridging its upper edges to form a closed tubular heating chamber. Within this tubular chamber is positioned an electric heating unit 38 of any suitable description, while along its forward edge is fixed, as by means of an angle bracket 39, a tubular support 40. The plate 37 is maintained at a high temperature by means of the electric heating unit so that a toe stiffener of the form shown at 45 in Figure 7 may be placed on the supporting rod 40 with its skived rear margin 46 in contact with the hot plate 37. This causes the thermoplastic material with which the blank 45 is saturated to fry out or exude at the surface of the skived portion as indicated in Figure 7. While this material is still warm and tacky the blank is inserted as shown in Figure 6 in proper position in the assembled upper, in this figure 47 indicating the vamp, 48 the vamp doubler and 49 the lining. This may be done while the shoe upper is held in position on the platform 34 as shown in dotted lines in Figure 1. The treadle is then depressed to depress the table 2 and the shoe is moved backwardly beneath the roller 31. The table is then allowed to rise to press the upper against the roller, and, as this roller is caused to move back and forth over the table 2 by the reciprocation of the carriage 15, the shoe parts are rolled into intimate contact so that the exuded thermoplastic material is caused to penetrate the adjacent portions of the upper and adhere thereto.

Where a doubler is employed, as shown in Figure 3, the stiffener is between two fabric layers, while where the doubler is not employed, the stiffener engages on one side with the shoe lining and on the other side with the comparatively rough and soft face of the vamp leather with which it may firmly unite. When the parts have been thus firmly pressed together the table 2 is again depressed and the upper removed therefrom.

Having thus described an embodiment of this invention it should be evident to those skilled in the art that various changes and modifications may be made therein without departing from its spirit or scope as defined by the appended claims.

I claim:

1. An apparatus of the class described comprising a vertically movable table, means normally holding said table elevated, means for depressing said table, a stationary platform adjacent to said table at the level of its depressed position, and a pressure member above said table at a fixed distance from the level of said platform and cooperating with said table to press material therebetween when said table is in elevated position.

2. An apparatus of the class described comprising a vertically movable table, means normally holding said table elevated, means for depressing said table, a stationary platform adjacent to said table at the level of its depressed position, a pressure member above said table and cooperating therewith to press material therebetween when said table is in elevated position, and means to reciprocate said pressure member parallel to said platform.

3. An apparatus of the class described comprising a table, a pair of parallel rods arranged adjacent to said table with capability of axial reciprocation, a carriage fixed to said rods and extending over said table, a crank pin engaging a guideway in said carriage laterally of said rods, means for rotating said crank pin to reciprocate said carriage, a roller carried by said carriage over said table, and means to resiliently urge said roller and table together to cause said roller to press against work supported on said table.

4. An apparatus of the class described comprising a table, a carriage having one end projecting over said table, means at one side of said table for guiding said carriage for reciprocatory movement, a roller carried by said end of said carriage for engaging work on said table, a worm wheel adjacent to said guiding means, a crank pin carried by said worm wheel and engaging within a guideway longitudinally of such carriage, a worm engaging said worm wheel, and means for driving said worm.

5. An apparatus of the class described comprising a vertically movable table, resilient means normally holding said table elevated, means for depressing said table, means for limiting the extent of such depression, a platform having its upper face level with the top of said table when in its depressed position, and a presser member movable above said table at a fixed distance above said platform and against which work on said table is held when said table is elevated.

In testimony whereof I have affixed my signature.

WILLIAM H. BAYNARD.